(12) United States Patent
Yamamoto (10) Patent No.: US 11,063,436 B2
(45) Date of Patent: Jul. 13, 2021

(54) POWER CONVERSION DEVICE

(71) Applicant: Murata Manufacturing Co., Ltd., Nagaokakyo (JP)

(72) Inventor: Yuta Yamamoto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/887,043

(22) Filed: May 29, 2020

(65) Prior Publication Data

US 2020/0403410 A1   Dec. 24, 2020

(30) Foreign Application Priority Data

Jun. 21, 2019   (JP) .............. JP2019-115919

(51) Int. Cl.
*H02J 3/38* (2006.01)
*H02M 1/42* (2007.01)
*H02J 3/50* (2006.01)

(52) U.S. Cl.
CPC .............. *H02J 3/381* (2013.01); *H02J 3/388* (2020.01); *H02J 3/50* (2013.01); *H02M 1/42* (2013.01); *H02J 2300/24* (2020.01)

(58) Field of Classification Search
CPC .... H02J 3/381; H02J 3/388; H02J 3/50; H02J 3/38
See application file for complete search history.

(56) References Cited

FOREIGN PATENT DOCUMENTS

| JP | 2015177734 A | 10/2015 |
|---|---|---|
| JP | 2016034217 A | 3/2016 |
| JP | 2018082570 A | 5/2018 |

*Primary Examiner* — Robert L Deberadinis
(74) *Attorney, Agent, or Firm* — Arent Fox LLP (57) ABSTRACT

A power conditioner that includes a voltage detection unit that detects a voltage value of output voltage of the power conditioner, a current detection unit that detects a current value of output current of the power conditioner, and a constant power factor control unit that performs a constant power factor control process of a power factor of output power of the power conditioner to become a preset power factor command value. The constant power factor control unit performs the constant power factor control process using the detected voltage and current values at a second moment in past, the second moment in past being earlier than a first moment by a preset reference time period, and the first moment being a moment at which the voltage and current values are acquired for performing the constant power factor control process.

20 Claims, 7 Drawing Sheets

POWER CONVERSION DEVICE

CROSS REFERENCE TO RELATED APPLICATION

The present application claims priority to Japanese Patent Application No. 2019-115919, filed Jun. 21, 2019, the entire contents of which are incorporated herein by reference.

FIELD OF THE INVENTION

The present invention relates to power conversion devices.

BACKGROUND

As a power conversion device for grid connection for connecting a distributed power source to a commercial power grid, there is a proposed device that has an islanding operation detection function and a constant power factor control function that performs a feedback control in such a manner as to maintain a constant power factor in the output power. For example, as described in Japanese Unexamined Patent Application Publication No. 2018-82570 ("patent document 1"), a power conversion device for grid connection is described that includes the islanding operation detection function that utilizes a so-called frequency feedback technique with step injection and injects reactive power in such a manner as to promote variation of the frequency of power output from an inverter when the voltage frequency of power grid (normally about 50 Hz) varies.

Further, the power conversion device performs a feedback control on the injection amount of the reactive power in such a manner as to maintain the power factor of the output power from the inverter at a preset power factor command value (for example, about 95%) for the purpose of, for example, suppressing a voltage increase in a commercial power grid. Further, in this power conversion device for grid connection, different control response properties are employed for a first PI controller for the constant power factor control and a second PI controller for the islanding operation detection by making their delay times and convergence times different from each other, in order to suppress delay in detecting the islanding operation mode when the foregoing islanding operation detection function is affected by the constant power factor control function.

However, the power conversion device for grid connection described in patent document 1 injects a small amount of reactive power even at a delay time Td. Thus, when the reactive power injection for the islanding operation detection is affected by the reactive power injection for the constant power factor control, the detection of the islanding operation mode may delay.

SUMMARY OF THE INVENTION

The exemplary embodiments of the present invention is made in view of the foregoing issues. Thus, it is an object of the present invention to provide a power conversion device configured for properly performing the constant power factor control while improving accuracy of the islanding operation detection.

According to exemplary embodiments, a power conversion device for connecting a distributed power source to a grid power source is provided and that includes a voltage detection unit that detects a voltage value of output voltage of the power conversion device; a current detection unit that detects a current value of output current of the power conversion device; and a constant power factor control unit that performs a constant power factor control process that controls a power factor of output power of the power conversion device such that the power factor becomes equal to a preset power factor command value by injecting reactive power to a grid power source side based on the voltage value detected by the voltage detection unit and the current value detected by the current detection unit. Moreover, the device includes an islanding operation detection unit that performs an islanding operation detection process that calculates a variation amount of frequency of grid voltage of the grid power source from a cycle of voltage waveform detected by the voltage detection unit and determines whether or not the power conversion device is in an islanding operation mode based on a variation amount of frequency of the grid voltage after injecting reactive power whose amount is associated with the calculated variation amount to the grid power source side. In addition, the constant power factor control unit performs the constant power factor control process using a voltage value detected by the voltage detection unit and a current value detected by the current detection unit at a second moment in time that is earlier than a first moment by a preset reference time period, the first moment being a moment in time at which the voltage value detected by the voltage detection unit and the current value detected by the current detection unit are acquired for performing the constant power factor control process.

Further, in the power conversion device according to an exemplary embodiment, the reference time period may be longer than a length of time required for the islanding operation detection process.

Further, in the power conversion device according to an exemplary embodiment, the reference time period may be equal to or longer than 200 milliseconds.

Further, the power conversion device according to an exemplary embodiment, can further include a power factor value storage unit that stores, in time sequence, power factor value information indicating a power factor value calculated based on voltage value information indicating a voltage value detected by the voltage detection unit and current value information indicating a current value detected by the current detection unit at same time period as the voltage value detected by the voltage detection unit. In this aspect, the constant power factor control unit is configured to inject reactive power to the grid power source side based on a power factor value indicated by the power factor value information stored in the power factor value storage unit.

Further, in the power conversion device according to an exemplary embodiment, the islanding operation detection unit is configured to perform detection of islanding operation when absolute value of a maximum variation amount of frequency of the grid voltage during a preset determination time period is equal to or greater than a preset variation amount threshold value, and can avoid performing the detection of islanding operation when the absolute value of the maximum variation amount of frequency of the grid voltage during the determination time period is less than the variation amount threshold value.

Further, in the power conversion device according to an exemplary embodiment, the constant power factor control unit can include a command value storage unit that stores command value information indicating the power factor command value, and a reactive power injection amount calculation unit that calculates an injection amount of reactive power to be injected to the grid power source side based on the power factor command value indicated by the command value information stored in the command value storage unit.

According to exemplary embodiments, the constant power factor control unit can be configured to perform the constant power factor control process using the voltage detected by the voltage detection unit and the current detected by the current detection unit at a second moment in time that is earlier than a first moment by a preset reference time period, with the first moment being a moment at which the voltage value detected by the voltage detection unit and the current value detected by the current detection unit are acquired for performing the constant power factor control process. This configuration enables the constant power factor control unit to suppress effects of power factor variation caused by injecting reactive power to the grid power source side on the islanding operation detection, thereby enabling the improvement of islanding operation detection accuracy.

Other features, elements, characteristics and advantages of the exemplary embodiments of the present invention will become more apparent from the following detailed description of preferred embodiments of the present invention with reference to the attached drawings.

DETAILED DESCRIPTION OF EMBODIMENTS

Hereinafter, exemplary embodiments of the present invention will be described in detail with reference to the drawings. In general, a power conversion device is provided for connecting a distributed power source to a grid power source. This power conversion device includes an inverter, a voltage detection unit that detects output voltage of the inverter, a current detection unit that detects output current of the inverter, a constant power factor control unit, and an islanding operation detection unit. The constant power factor control unit performs a constant power factor control process that controls the power factor of output power of the inverter in such a way that the power factor becomes equal to a preset power factor command value by injecting reactive power to the grid power source side based on the voltage detected by the voltage detection unit and the current detected by the current detection unit. The islanding operation detection unit performs an islanding operation detection process that calculates a variation amount of frequency of grid voltage of the grid power source from a time difference between time when the voltage detected by the voltage detection unit becomes zero and time when the voltage becomes zero again and determines whether or not the power conversion device is in an islanding operation mode based on a variation amount of frequency of the grid voltage after injecting reactive power whose amount is associated with the calculated variation amount to the grid power source side. Further, the constant power factor control unit performs a constant power factor control process using the voltage value detected by the voltage detection unit and the current value detected by the current detection unit at a second moment in past, the second moment in past being earlier than a first moment by a preset reference time period, the first moment being a moment at which the voltage value detected by the voltage detection unit and the current value detected by the current detection unit are acquired for performing the constant power factor control process.

Figure 1:
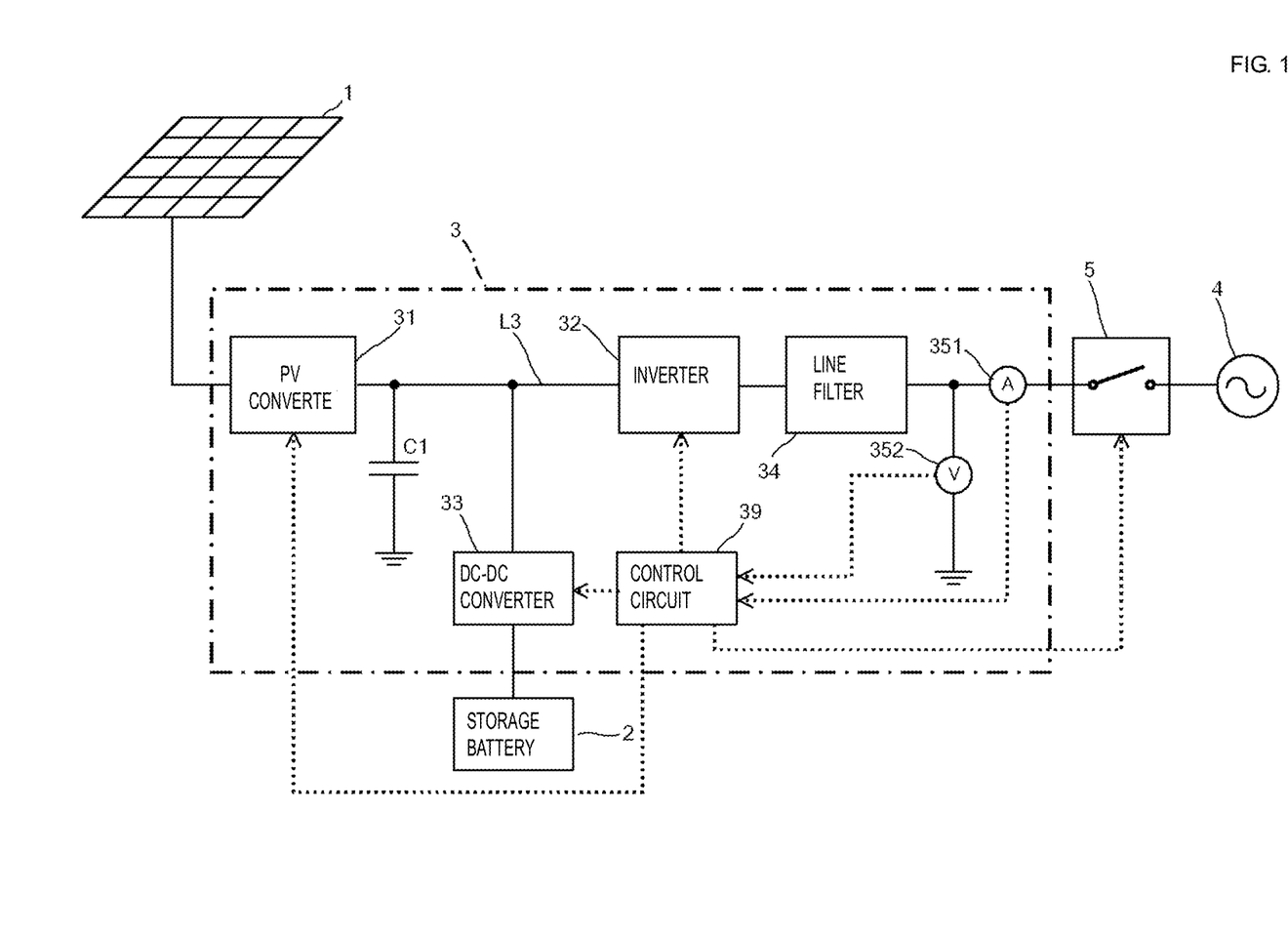
FIG. 1 is a diagram illustrating a configuration of a power source system according to an exemplary embodiment of the present invention.

As illustrated in FIG. 1, a power source system according to the present embodiment includes a photovoltaic cell 1, a storage battery 2, a power conditioner 3 connected to the photovoltaic cell 1, the storage battery 2, and a grid power source 4, and a grid connection relay 5. The grid power source 4 supplies an AC power to the power conditioner 3 using, for example, a single-phase three-wire system. The power conditioner 3 is a power conversion device for connecting the photovoltaic cell 1 or the storage battery 2, which are each a distributed power source, to the grid power source 4.

As further shown, the power conditioner 3 includes a PV converter 31, an inverter 32, a DC-DC converter 33, a line filter 34, a control circuit 39, a current detection unit 351, and a voltage detection unit 352. The PV converter 31, the inverter 32, and the DC-DC converter 33 are connected to each other via a HVDC bus L3. Further, a capacitor C1 is connected to the HVDC bus L3 for suppressing voltage variation in the HVDC bus L3.

The PV converter 31 is a DC-DC converter that steps up a DC voltage input from the photovoltaic cell 1 and outputs a stepped-up voltage. Alternatively, the PV converter 31 can be the component having a function of adjusting the input voltage from the photovoltaic cell 1 by performing a maximum power point tracking (MPPT) control based on a control signal input from the control circuit 39. The inverter 32 is a bi-directional DC-AC inverter and includes a plurality of switching devices (not illustrated) that switch in response to a pulse width modulation (PWM) signal input from the control circuit 39. The inverter 32 converts a DC voltage input from the HVDC bus L3 into an AC voltage and outputs a converted AC voltage, and further converts an AC voltage supplied from the grid power source 4 into a DC voltage and outputs a converted DC voltage to the HVDC bus L3.

The DC-DC converter 33 is a bi-directional DC-DC converter, is connected between the storage battery 2 and the HVDC bus L3, and operates either in a discharge mode in which electricity stored in the storage battery 2 is discharged to the HVDC bus L3 or a charge mode in which the storage battery 2 is charged by supplying power from the HVDC bus L3 to the storage battery 2. Here, when the DC-DC converter 33 is operated in the discharge mode, the output voltage of the storage battery 2 is stepped up and output to the HVDC bus L3 in such a manner as to maintain a constant output voltage to the HVDC bus L3. Further, when the DC-DC converter 33 is operated in the charge mode, a DC power input from the HVDC bus L3 is stepped down and output to the storage battery 2. In an exemplary aspect, the line filter 34 is formed of an inductor and a capacitor and is configured to remove a high frequency switching noise component from an AC power output from the inverter 32.

The current detection unit 351 detects a current value of an output current of the power conditioner 3, that is, a current value of a current flowing between the inverter 32 and the grid power source 4. Moreover, the voltage detection unit 352 detects a voltage value of an output voltage of the power conditioner 3, that is, a voltage value of the grid power source 4 (hereinafter, referred to as "grid voltage" for purposes of this disclosure). The current detection unit 351 and the voltage detection unit 352 respectively measure the current value and the voltage value at a sampling period of, for example, about 400 nsec or less in an exemplary aspect. In the present invention, an object of the current detection unit 351 and the voltage detection unit 352 is not to measure the absolute values of current and voltage, but to measure their zero-crossing points (i.e., the time when voltage or current becomes zero) and measure a voltage frequency or a phase difference between the voltage and the current to utilize them for controlling the reactive current or the power factor. The grid connection relay 5 is a switch for switching between a connection state and a disconnection state of the power conditioner 3 with the grid power source 4, and is configured to open or close in response to a control signal input from the control circuit 39.

The control circuit 39 includes, for example, a digital signal processor (DSP) and a memory with instructions stored thereon for executing the algorithms described herein. In an exemplary aspect, the control circuit 39 is configured to execute software instructions stored on the memory to configure each of the units described below for performing the functions and algorithms described herein.

Figure 2:
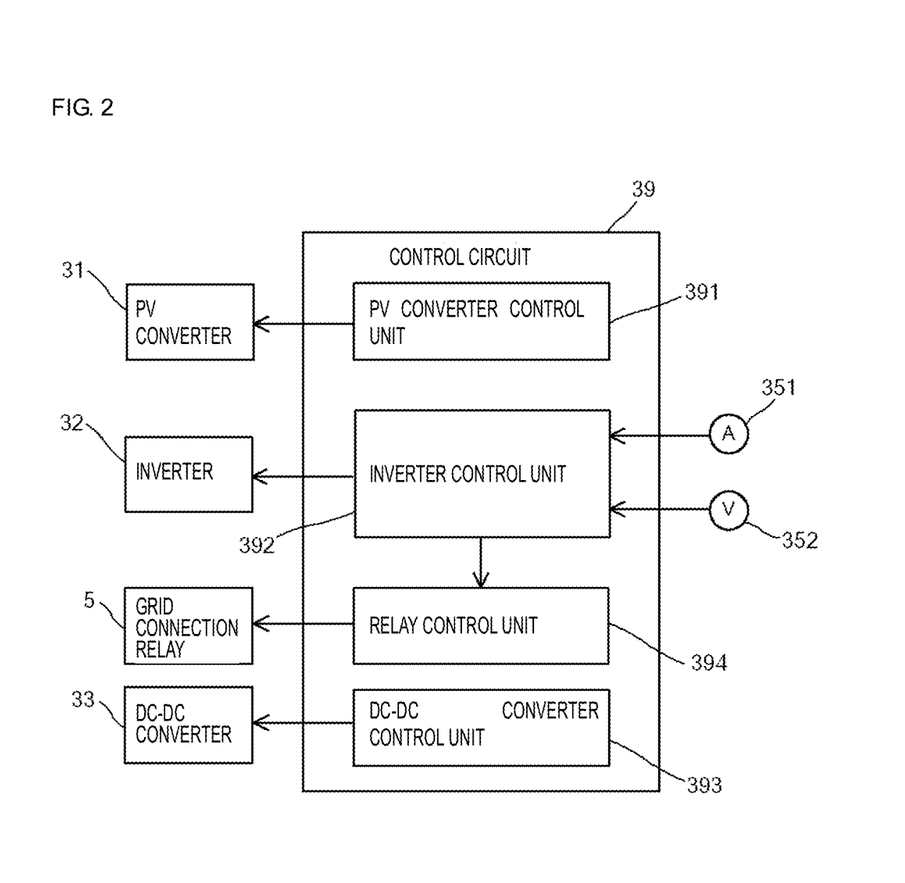
FIG. 2 is a block diagram of a control circuit according to an exemplary embodiment.

As illustrated in FIG. 2, the control circuit 39 includes a PV converter control unit 391, an inverter control unit 392, a DC-DC converter control unit 393, and a relay control unit 394. The PV converter control unit 391 generates a control signal for controlling the PV converter 31 in such a manner as to maintain a constant output voltage of the PV converter 31 and outputs the generated control signal to the PV converter 31. The DC-DC converter control unit 393 generates a control signal for causing the DC-DC converter 33 to operate either in the charge mode or the discharge mode and outputs the generated control signal to the DC-DC converter 33.

The relay control unit 394 is configured to open or close the grid connection relay 5 by outputting a control signal to the grid connection relay 5 based on disconnection command information or connection command information output from the inverter control unit 392. Upon receiving the disconnection command information from the inverter control unit 392, the relay control unit 394 generates a control signal to open the grid connection relay 5 and outputs the generated control signal to the grid connection relay 5. Further, when the grid connection relay 5 is open, upon receiving the connection command information from the inverter control unit 392, the relay control unit 394 generates a control signal to close the grid connection relay 5 and outputs the generated control signal to the grid connection relay 5.

Figure 3:
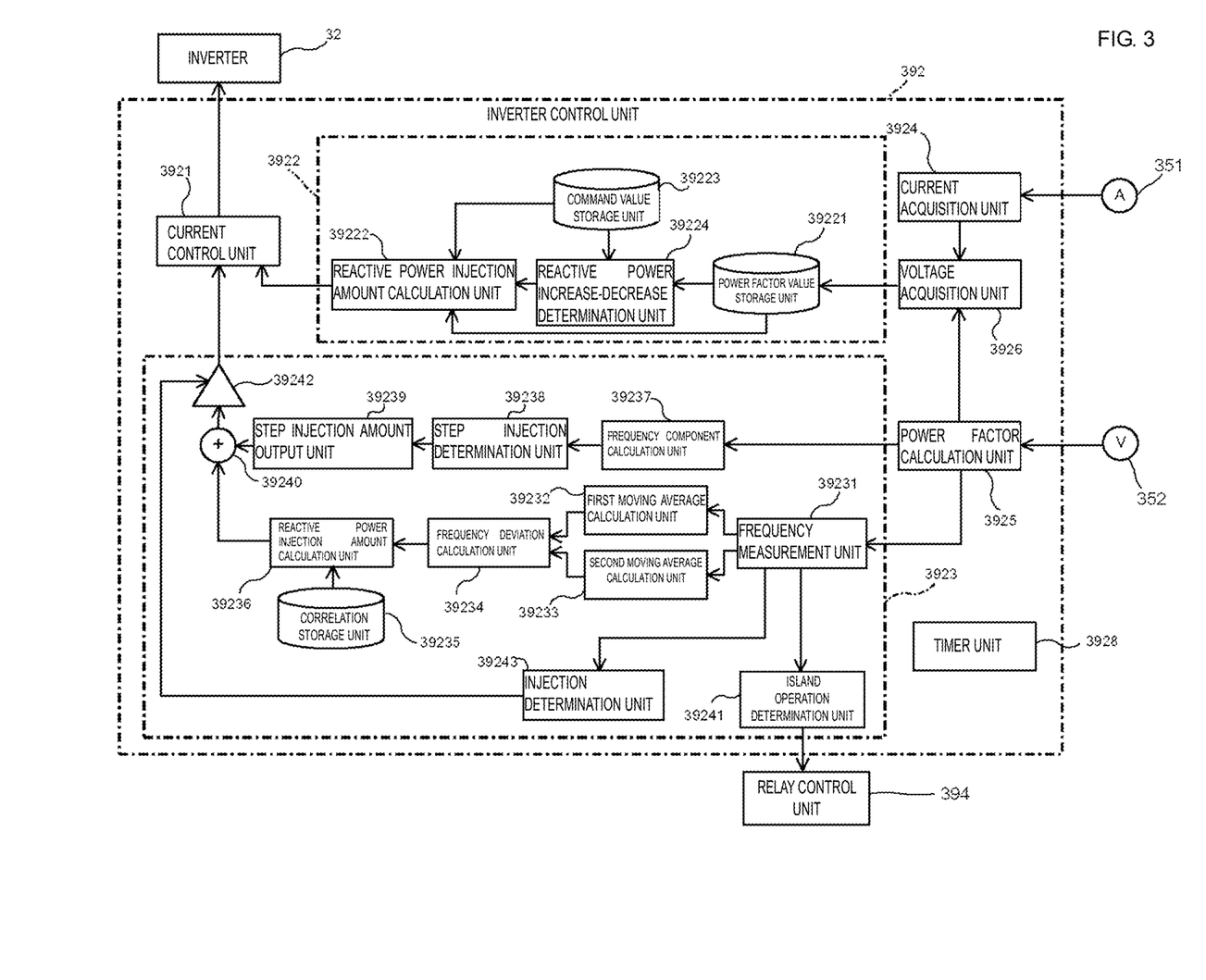
FIG. 3 is a block diagram of an inverter control unit according to an exemplary embodiment.

As illustrated in FIG. 3, the inverter control unit 392 includes a current control unit 3921, a constant power factor control unit 3922, an islanding operation detection unit 3923, a current acquisition unit 3924, a voltage acquisition unit 3925, a power factor calculation unit 3926, and a timer unit 3928. The current control unit 3921 generates a PWM signal based on reactive power injection amount information input from the constant power factor control unit 3922 or the islanding operation detection unit 3923 and outputs the generated PWM signal to the inverter 32. This configuration and operator enables the current control unit 3921 to inject reactive power indicated by the reactive power injection amount information to the grid power source 4 side of the inverter 32.

The power factor calculation unit 3926 is configured to calculate a power factor by using voltage value information indicating a voltage value detected by the voltage detection unit 352 and current value information indicating a current value detected by the current detection unit 351 at the same time period as this voltage value. The voltage acquisition unit 3925 is configured to acquire the voltage value information indicating a voltage value measured by the voltage detection unit 352 and to output the acquired voltage value information to the islanding operation detection unit 3923 and the power factor calculation unit 3926. The current acquisition unit 3924 is configured to acquire the current value information indicating a current value measured by the current detection unit 351 and to output the acquired current value information to the power factor calculation unit 3926 while making a connection with the voltage value information indicating the voltage value detected at the same time period. The timer unit 3928 is configured to measure time when the voltage acquisition unit 3925 acquired the voltage value information as time when the voltage detection unit 352 detected the voltage value, and measures time when the current acquisition unit 3924 acquired the current value information as time when the current detection unit 351 detected the current value.

The constant power factor control unit 3922 is configured to control the power factor of output power of the power conditioner 3 in such a way that the power factor becomes equal to a preset power factor command value by injecting reactive power to the grid power source 4 side based on the voltage value detected by the voltage detection unit 352 and the current value detected by the current detection unit 351. The constant power factor control unit 3922 includes a command value storage unit 39223 that stores command value information indicating a power factor command value and a reactive power injection amount calculation unit 39222 that calculates the injection amount of reactive power to be injected to the grid power source 4 side based on the power factor command value indicated by the command value information stored in the command value storage unit 39223. The foregoing power factor command value is set to, for example, about 95% in the exemplary aspect. Further, the constant power factor control unit 3922 includes a power factor value storage unit 39221 that stores a power factor of the output power of the power conditioner 3 and a reactive power increase-decrease determination unit 39224 that determines an increase or a decrease of the injection amount of reactive power to the grid power source 4 side of the inverter 32.

Moreover, the power factor value storage unit 39221 is configured to store a power factor value calculated by the power factor calculation unit 3926. The reactive power increase-decrease determination unit 39224 is configured to determine whether the injection amount of reactive power should be increased or decreased based on a magnitude relationship between the power factor value stored in the power factor value storage unit 39221 and the power factor command value indicated by the command value information stored in the command value storage unit 39223. Specifically, when the calculated power factor is less than the power factor command value, the reactive power increase-decrease determination unit 39224 determines that the injection amount of reactive power should be increased by a preset unit injection amount. Whereas, when the stored power factor value is equal to or larger than the power factor command value, the reactive power increase-decrease determination unit 39224 determines that the injection amount of reactive power should be decreased.

The reactive power injection amount calculation unit 39222 is configured to calculate a reactive power injection amount based on a determination result of the reactive power increase-decrease determination unit 39224. Further, at the start of the power conditioner 3 or at a preset power factor adjustment time period, the reactive power injection amount calculation unit 39222 calculates a difference value between the power factor stored in the power factor value storage unit 39221 and the power factor command value indicated by the command value information stored in the command value storage unit 39223, and further calculates the injection amount of reactive power based on the calculated difference value.

The islanding operation detection unit 3923 is configured to calculate a variation amount of frequency of grid voltage of the grid power source 4 from fluctuations in the voltage value detected by the voltage detection unit 352. Further, the islanding operation detection unit 3923 is configured to perform an islanding operation detection process that determines whether or not the power conditioner 3 is in the islanding operation mode based on a variation amount of frequency of the grid voltage after injecting reactive power whose amount is associated with the calculated variation amount of the frequency to the grid power source side of the inverter 32. As further shown, the islanding operation detection unit 3923 includes a frequency measurement unit 39231, a first moving average calculation unit 39232, a second moving average calculation unit 39233, a frequency deviation calculation unit 39234, a correlation storage unit 39235, and a reactive power injection amount calculation unit 39236. The frequency measurement unit 39231 measures time of zero-crossing point in a voltage waveform detected by the voltage detection unit 352 and calculates frequency based on a time difference with a subsequent zero-crossing point. Further, the frequency measurement unit 39231 calculates frequency of the grid voltage based on the calculated cycle.

Figure 4A:
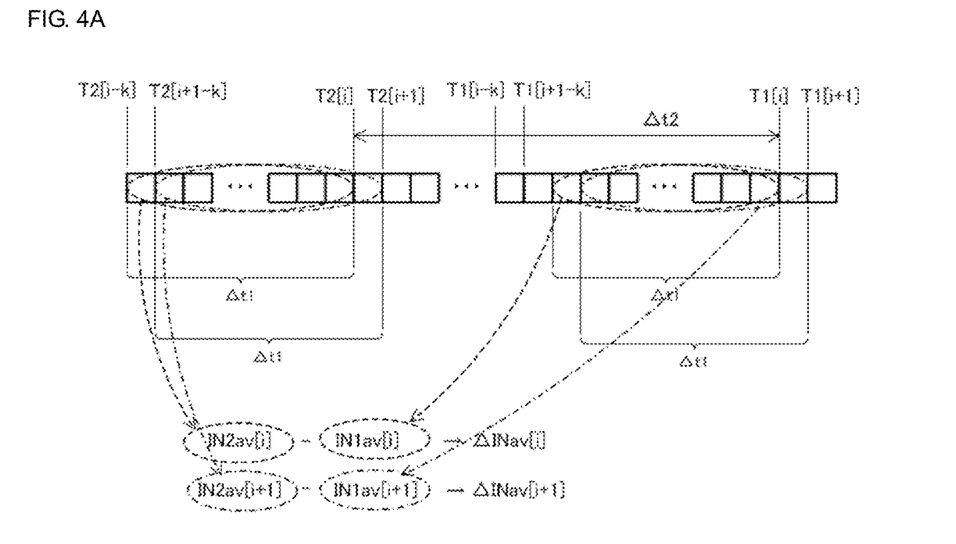
FIG. 4A is a diagram illustrating operation of an islanding operation detection unit according to an exemplary embodiment.

The first moving average calculation unit 39232 is configured to calculate, as a recent cycle, an average value of cycles of the grid voltage during a period between the present moment and a moment that is earlier than the present moment by a preset average target time period. Whereas, the second moving average calculation unit 39233 is configured to calculate, as a past cycle, an average value of cycles of the grid voltage between a moment in past, which is earlier than the present moment by a preset reference time period, and a moment that is earlier than that moment by the foregoing average target time period. For example, as illustrated in FIG. 4A, the first moving average calculation unit 39232 calculates, as the recent cycle, the average value IN1av[i] of cycles of the grid voltage during the time period Δt2 between the present moment T1[i] and the moment T1[i–k] that is earlier than the present moment T1[i] by the preset average target time period Δt1. Whereas, the second moving average calculation unit 39233 calculates, as the past cycle, the average value IN2av[i] of cycles of the grid voltage between the moment T2[i] in past, which is earlier than the present moment T1[i] by the reference time period Δt2, and the moment T2[i–k] that is earlier than the moment T2[i] by the average target time period Δt1.

According to an exemplary aspect, the length of the average target time period Δt1 is set to, for example, about 40 msec. Further, the reference time period Δt2 is set to, for example, about 200 msec. Next, at the time T1[i+1], the first moving average calculation unit 39232 calculates the average value IN1av[i+1] of cycles of the grid voltage during the time period Δt2 between the present moment T1[i+1] and the moment T1[i+1–k] in past, and the second moving average calculation unit 39233 calculates, as the past cycle, the average value IN2av[i] of cycles of the grid voltage between the moment T2[i+1] in past and the moment T2[i–k] that is earlier than the moment T2[i] by the average target time period Δt1. Here, an average value calculation cycle in each of the first moving average calculation unit 39232 and the second moving average calculation unit 39233, that is, a period between the moments T1[i] and T1[i+1] is set to, for example, about 5 msec.

Returning to FIG. 3, the frequency deviation calculation unit 39234 is further configured to calculate a difference value between the recent cycle calculated by the first moving average calculation unit 39232 and the past cycle calculated by the second moving average calculation unit 39233. For example, as illustrated in FIG. 4A, the frequency deviation calculation unit 39234 calculates, at the moment T1[i], the difference value ΔINav[i] between the average value IN1av[i] and the average value In2av[i]. Further, the frequency deviation calculation unit 39234 calculates, at the moment T1[I+1], the difference value ΔINav[i+1] between the average value IN1av[i+1] and the average value In2av[i+1]. Further, the frequency deviation calculation unit 39234 outputs the reciprocal of the calculated difference value as the frequency deviation.

Figure 4B:
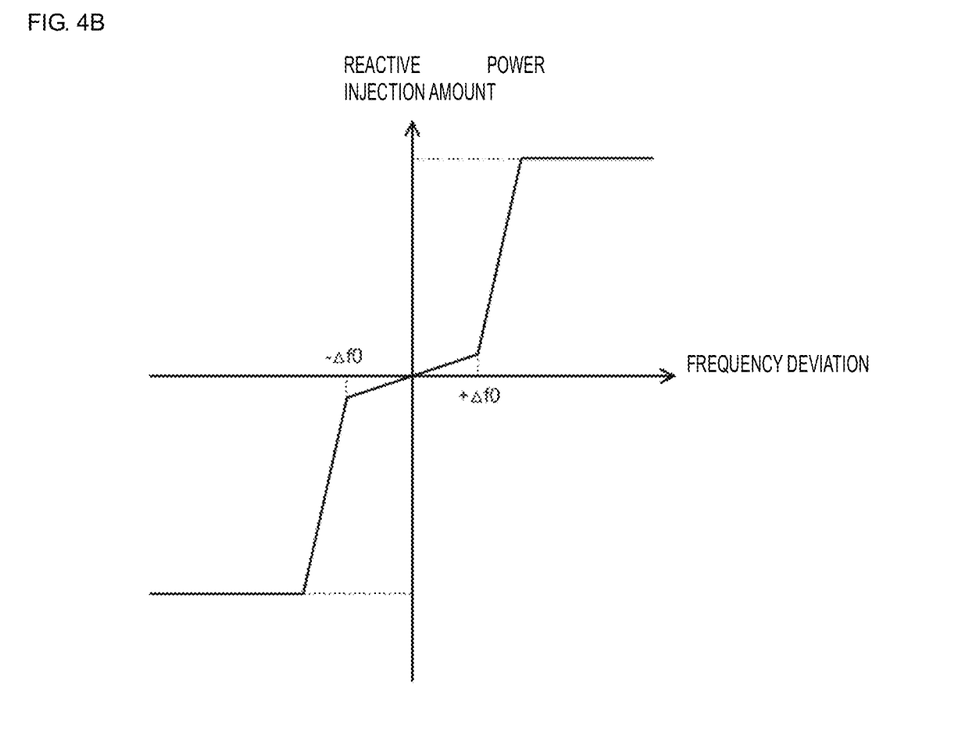
FIG. 4B is a diagram illustrating content of correlation information stored by a correlation storage unit according to an exemplary embodiment.

Returning back to FIG. 3, the correlation storage unit 39235 then stores correlation information indicating correlation relationship between the frequency deviation and the reactive power injection amount as illustrated in FIG. 4B, for example. This correlation information indicates a relationship in which the gain of the reactive power injection amount with respect to the variation of the frequency deviation increases when the absolute value of the frequency deviation exceeds a threshold value |Δf0|. That is to say, the setting is made in such a manner as to promote the injection of reactive power when the absolute value of the frequency deviation exceeds a threshold value |Δf0|. Here, threshold value |Δf0| is set to, for example, about 0.01 Hz.

Returning to FIG. 3, the reactive power injection amount calculation unit 39236 is configured to calculate the reactive power injection amount based on the correlation information stored in the correlation storage unit 39235 and the frequency deviation input from the frequency deviation calculation unit 39234. Further, the reactive power injection amount calculation unit 39236 then outputs reactive power injection amount information indicating the calculated reactive power injection amount to an addition unit 39240.

Yet as further shown, the islanding operation detection unit 3923 includes a frequency component calculation unit 39237, a step injection determination unit 39238, and a step injection amount output unit 39239. The frequency component calculation unit 39237 is configured to calculate effective voltage values of a fundamental wave component and a harmonic wave component of a voltage waveform by performing, for example, a discrete Fourier analysis process on the voltage waveform that indicates fluctuation of voltage value obtained from the voltage value information input from the voltage acquisition unit 3925.

The step injection determination unit 39238 is configured to determine whether or not the effective voltage values of the fundamental wave component and the harmonic wave component of a voltage waveform, which are calculated by the frequency component calculation unit 39237, meet a preset step injection start condition. When the step injection determination unit 39238 determines that the effective voltage values of the fundamental wave component and the harmonic wave component of the voltage waveform meet the foregoing step injection start condition, the step injection amount output unit 39239 then outputs the reactive power injection amount information indicating a preset injection amount of reactive power continuously to the addition unit 39240 for a preset time period.

The addition unit 39240 is configured to add the reactive power injection amount indicated by the reactive power injection amount information input from the step injection amount output unit 39239 to the reactive power injection amount indicated by the reactive power injection amount information input from the reactive power injection amount calculation unit 39236. Further, the addition unit 39240 then outputs reactive power injection amount information indicating the reactive power injection amount obtained by addition.

A switching unit 39242 is configured to switch between an output state in which the reactive power injection information from the addition unit 39240 is output to the current control unit 3921 and a stop state in which the reactive power injection information from the addition unit 39240 is not output to the current control unit 3921. An injection determination unit 39243 is configured to determine whether or not the absolute value of the maximum variation amount of the frequency of the grid voltage during a preset determination time period is equal to or greater than a preset variation amount threshold value. Further, when the injection determination unit 39243 determines that the absolute value of the maximum variation amount of the frequency of the grid voltage is less than the variation amount threshold value, the injection determination unit 39243 outputs stop command information to the switching unit 39242. Here, the stop command information instructs the switching unit 39242 to stop output of the reactive power injection amount information from the addition unit 39240 to the current control unit 3921. Whereas, when the injection determination unit 39243 determines that the absolute value of the maximum variation amount of the frequency of the grid voltage is equal to or greater than the variation amount threshold value, the injection determination unit 39243 then output output command information to the switching unit 39242. Here, the output command information instructs the switching unit 39242 to output the reactive power injection amount information from the addition unit 39240 to the current control unit 3921. Further, the switching unit 39242 is switched to the foregoing stop state when the stop command information is received from the injection determination unit 39243 and is switched to the foregoing output state when the output command information is received from the injection determination unit 39243.

An islanding operation determination unit 39241 is configured to determine whether or not the power conditioner 3 is in the islanding operation mode based on a variation amount of frequency of the grid voltage after injecting reactive power to the grid power source 4 side of the inverter 32, whose amount is equal to the injection amount indicated by the reactive power injection amount information output from the addition unit 30240. Specifically, when the variation amount of the frequency of the grid voltage after injecting reactive power to the grid power source 4 side of the inverter 32 is equal to or greater than a preset determination threshold value, the islanding operation determination unit 39241 determines that the power conditioner 3 is in the islanding operation mode. In this case, the islanding operation determination unit 39241 is configured to generate the disconnection command information for disconnecting the power conditioner 3 by opening the grid connection relay 5 and outputs the generated disconnection command information to the relay control unit 394.

Figure 5:
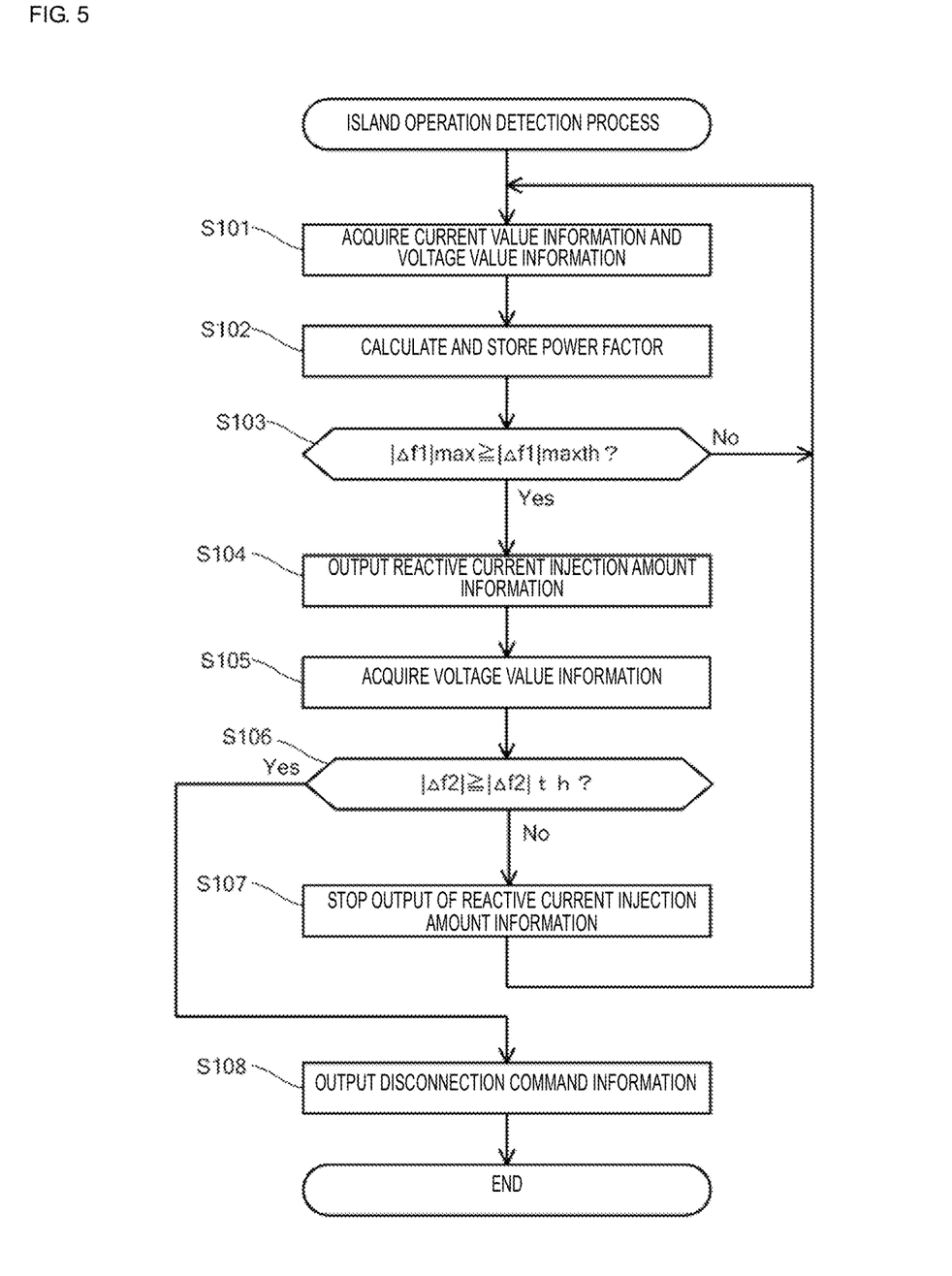
FIG. 5 is a flowchart illustrating an exemplary flow of an islanding operation detection process performed by a control circuit according to an exemplary embodiment.

Next, the islanding operation detection process performed by the inverter control unit 392 according to the present embodiment is described with reference to FIG. 5 and FIG. 6. This islanding operation detection process starts, for example, in response to the activation of the power conditioner 3 in the state where the grid connection relay 5 is closed. It is noted that in parallel to the performing of this islanding operation detection process, the control circuit 39 performs a process for controlling operation of the PV converter 31 and a process for controlling operation of the DC-DC converter 33.

First, the voltage acquisition unit 3925 acquires the voltage value information indicating a voltage value detected by the voltage detection unit 352, and the current acquisition unit 3924 acquires the current value information indicating a current value detected by the current detection unit 351 (step S101). Here, the voltage acquisition unit 3925 outputs the acquired voltage value information to the power factor calculation unit 3926, and the current acquisition unit 3924 outputs the acquired current value information to the power factor calculation unit 3926 while making a connection with the voltage value information indicating the voltage value detected at the same time period. Next, the power factor calculation unit 3926 calculates the power factor based on the input current value information and the input voltage value information, and stores the calculated power factor in the power factor value storage unit 39221 (step S102). At this time, the voltage acquisition unit 3925 outputs the acquired voltage value information to the islanding operation detection unit 3923.

Figure 6:
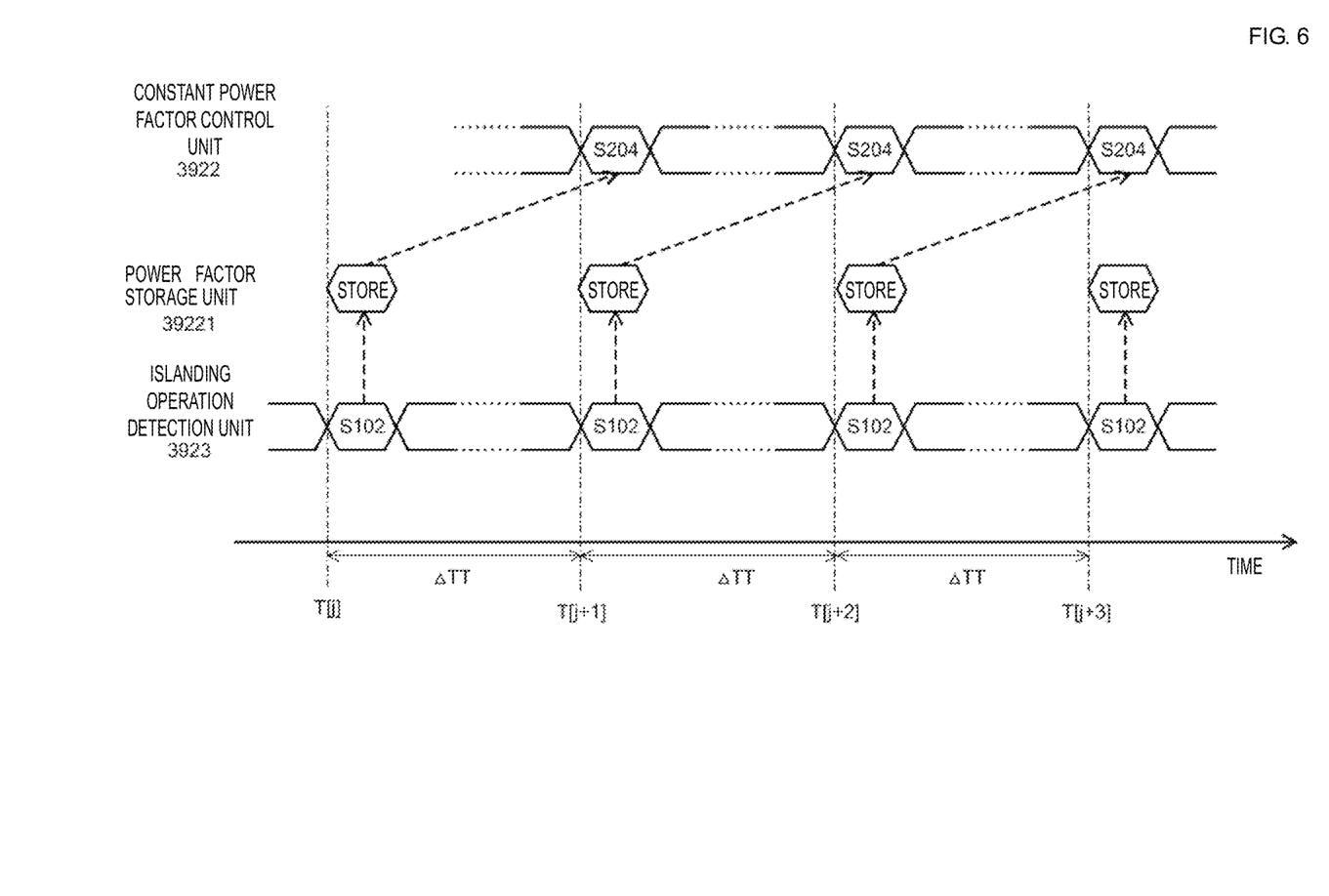
FIG. 6 is a diagram illustrating operation of a control circuit according to an exemplary embodiment.

As illustrated in FIG. 6, in this islanding operation detection process, at the time T[j], every time the process of step S102 is performed, the power factor is calculated by the power factor calculation unit 3926. The voltage acquisition unit 3925 and the current acquisition unit 3924 outputs, at the time T[j], the voltage value information indicating the voltage value detected by the voltage detection unit 352 and the current value information indicating the current value detected by the current detection unit 351 to the power factor calculation unit 3926.

Returning to FIG. 5, subsequently, the islanding operation detection unit 3923 determines whether or not the absolute value $|\Delta f1|max$ of the maximum variation amount of the frequency of the grid voltage during a preset determination time period is equal to or greater than a preset variation amount threshold value $|\Delta f1|maxth$ (step S103). Here, the variation amount threshold value $|\Delta f1|maxth$ can be set to, for example, a value less than about 0.01 Hz. When the islanding operation detection unit 3923 determines that the absolute value $|\Delta f1|max$ of the maximum variation amount of the frequency of the grid voltage is less than the variation amount threshold value $|\Delta f1|maxth$ (step S103: No), the method returns to the process of step S101, which is then performed again.

Whereas, when the islanding operation detection unit 3923 determines that the absolute value $|\Delta f1|max$ of the maximum variation amount of the frequency of the grid voltage is equal to or greater than the variation amount threshold value $|\Delta f1|maxth$ (step S103: Yes), the reactive power injection amount information indicating the reactive power injection amount is output to the current control unit 3921 (step S104). Here, the islanding operation detection unit 3923 outputs information indicating a reactive power injection amount obtained by adding the reactive power injection amount indicated by information input from the step injection amount output unit 39239 to the reactive power injection amount calculated by the foregoing reactive power injection amount calculation unit 39236. At this time, the current control unit 3921 controls the inverter 32 in such a way that the reactive power is injected to the grid power source 4 side of the inverter 32, the amount of the reactive power to be injected being equal to the injection amount indicated by the reactive power injection amount information input from the islanding operation detection unit 3923.

Subsequently, the voltage acquisition unit 3925 acquires the voltage value information indicating the voltage value detected by the voltage detection unit 352 (step S105). The voltage acquisition unit 3925 outputs the acquired voltage value information to the islanding operation detection unit 3923. Next, the islanding operation detection unit 3923 determines whether or not the absolute value $|\Delta f2|$ of the variation amount of the frequency of the grid voltage of the grid power source 4 is equal to or greater than a preset determination threshold value $|\Delta f2|th$ (step S106). When the islanding operation detection unit 3923 determines that the absolute value $|\Delta f2|$ of the variation amount of the frequency of the grid voltage is less than the determination threshold value $|\Delta f2|th$ (step S106: No), the islanding operation detection unit 3923 stops the output of the reactive power injection amount information to the current control unit 3921 (step S107). Subsequently, the process of step S101 is performed again and the method is repeated from that step.

Whereas, when the islanding operation detection unit 3923 determines that the absolute value $|\Delta f2|$ of the variation amount of the frequency of the grid voltage is equal to or greater than the determination threshold value $|\Delta f2|th$ (step S106: Yes), the islanding operation detection unit 3923 generates the disconnection command information and outputs to the relay control unit 394 (step S108). At this time, the relay control unit 394 opens the grid connection relay 5 by outputting a control signal to the grid connection relay 5.

Next, a constant power factor control process performed by the inverter control unit 392 according to the present embodiment is described with reference to FIG. 6 and FIG. 7. This constant power factor control process starts, for example, in response to activation of the power conditioner 3 in the state where the grid connection relay 5 is closed. It is noted that this constant power factor control process is performed in parallel to the foregoing islanding operation detection process.

Figure 7:
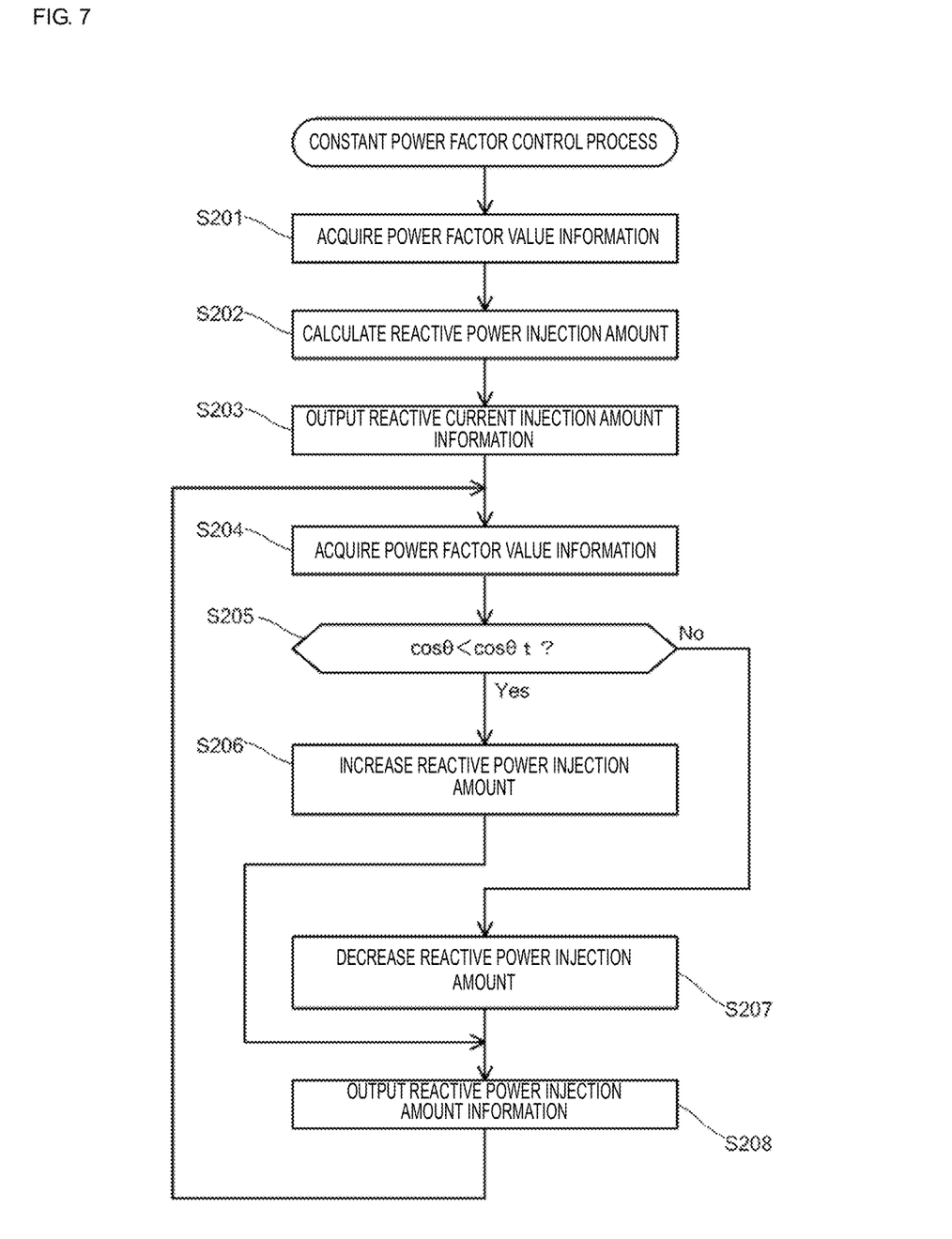
FIG. 7 is a flowchart illustrating an exemplary flow of a constant power factor control process performed by a control circuit according to an exemplary embodiment.

First, as illustrated in FIG. 7, the constant power factor control unit 3922 acquires the power factor value information stored in the power factor value storage unit 39221 (step S201). Next, the constant power factor control unit 3922 calculates the reactive power injection amount based on the acquired power factor value information and the power factor command value indicated by the command value information stored in the command value storage unit 39223 (step S202).

Subsequently, the constant power factor control unit 3922 outputs the reactive power injection amount information indicating the calculated reactive power injection amount to the current control unit 3921 (step S203). At this time, the current control unit 3921 controls the inverter 32 in such a way that the reactive power is injected to the grid power source 4 side of the inverter 32, the amount of the reactive power to be injected being equal to the injection amount indicated by the reactive power injection amount information input from the constant power factor control unit 3922.

Subsequently, the constant power factor control unit 3922 acquires the power factor value information stored in the power factor value storage unit 39221 (step S204). At this time, as illustrated in FIG. 6, the constant power factor control unit 3922 acquires the power factor value information that has been stored in the power factor value storage unit 39221 at the moment when the process of step S204 is performed. That is to say, the constant power factor control unit 3922 acquires the power factor value information indicating the power factor value calculated based on a voltage value and a current value respectively detected by the voltage detection unit 352 and the current detection unit 351 at a second moment in past. Here, the second moment in past is earlier than a first moment by a preset reference time period $\Delta TT$, and the first moment is the time point at which the voltage value detected by the voltage detection unit 352 and the current value detected by the current detection unit 351 are acquired for performing the constant power factor control process. For example, in the case where the step S204 is performed at time $T[j+1]$, power factor value information, which indicates the power factor value calculated based on the voltage value and the current value acquired by the voltage acquisition unit 3925 and the current acquisition unit 3924 at the time $T[j]$, is acquired. Here, the reference time period $\Delta TT$ is at least a length equal to or longer than the reference time period $\Delta t2$ at the time of calculating the foregoing frequency deviation. Accordingly, the reference time period $\Delta TT$ is set to, for example, a length equal to or longer than the reference time period $\Delta t2$. In the case where the length of the reference time period $\Delta t2$ is set to, for example, about 200 msec, the length of the reference time period $\Delta TT$ is about 200 msec or longer.

Next, returning to FIG. 7, the constant power factor control unit 3922 determines whether or not the calculated power factor cos θ is smaller than a power factor command value θt (step S205). When the constant power factor control unit 3922 determines that the calculated power factor cos θ is smaller than the power factor command value θt (step S205: Yes), the constant power factor control unit 3922 increases a reactive current injection amount at the present moment (step S206). Subsequently, the process of step S209, which will be described below, is performed.

Whereas, when the constant power factor control unit 3922 determines that the calculated power factor cos θ is equal to or greater than the power factor command value θt (step S205: No), the constant power factor control unit 3922 decreases the reactive current injection amount at the present moment (step S207). Subsequently, the constant power factor control unit 3922 outputs reactive power injection amount information indicating the calculated reactive current injection amount to the current control unit 3921 (step S208). Next, the process of step S201 is performed again. Further, the inverter control unit 392 makes the power factor of the power conditioner 3 converge on the power factor command value within 100 seconds by repeatedly performing a series of processes from the step S201 to the step S208.

As described above, according to the power conditioner 3 according to the present embodiment, the constant power factor control unit 3922 performs the constant power factor control process using the voltage value detected by the voltage detection unit 352 and the current value detected by the current detection unit 351 at the second moment in past.

Here, the second moment in past is earlier than the first moment by the preset reference time period ΔTT, and the first moment is the time point at which the voltage value detected by the voltage detection unit 352 and the current value detected by the current detection unit 351 are acquired for performing the constant power factor control process. This process enables the hindering of the constant power factor control unit 3922 from operating in such a manner as to reduce the power factor variation caused by injecting reactive power to the grid power source 4 side of the inverter 32 for detecting an islanding operation. Thus, accuracy of the islanding operation detection may be improved. Further, the constant power factor control unit 3922 reduces effects of the reactive power injection for the islanding operation detection on the power factor calculated in the constant power factor control process, and thus can properly perform the constant power factor control.

Further, the length of the foregoing reference time period ΔTT according to the present embodiment is longer than the time required for the islanding operation detection process and is set to, for example, about 200 msec or longer. This configuration enables the hindering of the constant power factor control unit 3922 from calculating the power factor using the voltage value and the current value detected by the voltage detection unit 352 and the current detection unit 351 during the islanding operation detection process. Accordingly, the constant power factor control unit 3922 can properly perform the constant power factor control.

Further, when the absolute value of the maximum variation amount of the frequency of the grid voltage during the foregoing determination time period is equal to or greater than the foregoing variation amount threshold value, the islanding operation detection unit 3923 according to the present embodiment performs the detection of islanding operation, and when the absolute value of the maximum variation amount of the frequency of the grid voltage during the determination time period is less than the variation amount threshold value, the islanding operation detection unit 3923 according to the present embodiment avoids performing the detection of islanding operation. This configuration suppresses the frequency of islanding operation detections that the islanding operation detection unit 3923 performs, and thus effects of the islanding operation detection on the constant power factor control performed by the constant power factor control unit 3922 can be reduced accordingly.

Further, the constant power factor control unit 3922 according to the present embodiment includes the command value storage unit 39223 that stores the command value information indicating the power factor command value and the reactive power injection amount calculation unit 39222 that calculates the injection amount of reactive power to be injected to the grid power source 4 side of the inverter 32 based on the power factor command value indicated by the command value information stored in the command value storage unit 39223. This configuration enables the power factor of the output power of the power conditioner 3 to converge on the power factor command value.

In general, it is noted that the exemplary embodiments of the present invention have been described in the foregoing section, but that the present invention is not limited to the configurations of the foregoing embodiments. For example, the power conditioner 3 may alternatively be configured to separately include a first voltage detection unit that detects the voltage value to be used in the constant power factor control process and a second voltage detection unit that detects the voltage value to be used in the islanding operation detection process. In this case, the first voltage detection unit may be configured to detect the grid voltage at the foregoing first moment and detect the grid voltage at the second moment in past that is earlier than the foregoing first moment by the preset reference time period ΔTT.

In the exemplary embodiments, the examples in which the length of the foregoing reference time period ΔTT is about 200 msec are described. Alternatively, the length of the reference time period ΔTT may be set to, for example, about 2.0 sec and thus the time period is not so limited.

Moreover, in the exemplary embodiments, the examples are described in which the constant power factor control unit 3922 calculates the power factor of output power using the voltage value and the current value detected by the voltage detection unit 352 and the current detection unit 351 at a moment included in a second time period, which is immediately before a most recent first time period. Alternatively, the configuration may be such that, for example, the constant power factor control unit 3922 calculates the power factor of output power using a voltage value and a current value detected by the voltage detection unit 352 and the current detection unit 351 at a moment included in the second time period, which is earlier than the most recent first time period and is immediately before the first time period.

In general, the exemplary embodiments of the present invention can be configured for the power conditioners for grid connection.

Moreover, while exemplary embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A power conversion device for connecting a distributed power source to a grid power source, the power conversion device comprising:
    a voltage detection unit configured to detect a voltage value of output voltage of the power conversion device;
    a current detection unit configured to detect a current value of output current of the power conversion device;
    a constant power factor control unit configured to control a power factor of output power of the power conversion device such that the power factor becomes equal to a preset power factor command value by injecting reactive power to a grid power source side based on the detected voltage value and the detected current value; and
    an islanding operation detection unit configured to:
        calculate a variation amount of frequency of grid voltage of the grid power source from a cycle of voltage waveform detected by the voltage detection unit, and
        determine whether the power conversion device is in an islanding operation mode based on the variation amount of frequency of the grid voltage after injecting the reactive power having an amount associated with the calculated variation amount to the grid power source side,
    wherein the constant power factor control unit controls a power factor of output power of the power conversion device based on the detected voltage and current values at a second moment in time that is earlier than a first moment in time by a preset reference time period, with the first moment in time being a moment at which the detected voltage and current values are acquired to control the power factor.

2. The power conversion device according to claim 1, wherein the reference time period is longer than a length of time required for the islanding operation detection unit configured to calculate the variation amount of frequency of grid voltage and determine whether the power conversion device is in the islanding operation mode.

3. The power conversion device according to claim 2, wherein the reference time period is equal to or longer than 200 milliseconds.

4. The power conversion device according to claim 1, further comprising a power factor value storage unit configured to store, in time sequence, power factor value information indicating a power factor value calculated based on voltage value information indicating a voltage value detected by the voltage detection unit and current value information indicating a current value detected by the current detection unit at a same time period as each other.

5. The power conversion device according to claim 4, wherein the constant power factor control unit is configured to inject reactive power to the grid power source side based on a power factor value indicated by the power factor value information stored in the power factor value storage unit.

6. The power conversion device according to claim 1, wherein the islanding operation detection unit is configured to detect the islanding operation mode when an absolute value of a maximum variation amount of frequency of the grid voltage during a preset determination time period is equal to or greater than a preset variation amount threshold value.

7. The power conversion device according to claim 6, wherein the islanding operation detection unit is configured to avoid detecting the islanding operation mode when the absolute value of the maximum variation amount of frequency of the grid voltage during the determination time period is less than the variation amount threshold value.

8. The power conversion device according to claim 5, wherein the constant power factor control unit includes a command value storage unit configured to store command value information indicating the power factor command value, and a reactive power injection amount calculation unit configured to calculate an injection amount of reactive power to be injected to the grid power source side based on the power factor command value indicated by the command value information stored in the command value storage unit.

9. The power conversion device according to claim 8, further comprising a reactive power increase-decrease determination unit configured to increase or decrease the injection amount of the reactive power injected to the grid power source side based on a magnitude relationship between the power factor value stored in the power factor value storage unit and the power factor command value indicated by the command value information stored in the command value storage unit.

10. The power conversion device according to claim 9, wherein the reactive power increase-decrease determination unit is configured to:
increase the injection amount of reactive power by a preset unit injection amount when the calculated power factor is less than the power factor command value, and
decrease the injection amount of reactive power by a preset unit injection amount when the calculated power factor is equal to or greater than the power factor command value.

11. The power conversion device according to claim 1, wherein the current detection unit and the voltage detection unit are configured to measure a voltage frequency or a phase difference between the detected voltage and the detected current that is used by the constant power factor control unit to control the power factor.

12. A power conversion method for connecting a distributed power source of a power conversion device to a grid power source, the power conversion method comprising:
detecting a voltage value of output voltage of the power conversion device;
detecting a current value of output current of the power conversion device;
controlling a power factor of output power of the power conversion device such that the power factor becomes equal to a preset power factor command value by injecting reactive power to a grid power source side based on the detected voltage value and the detected current value;
calculating a variation amount of frequency of grid voltage of the grid power source from a cycle of voltage waveform;
determining whether the power conversion device is in an islanding operation mode based on the variation amount of frequency of the grid voltage after injecting the reactive power having an amount associated with the calculated variation amount to the grid power source side; and
controlling a power factor of output power of the power conversion device based on the detected voltage and current values at a second moment in time that is earlier than a first moment in time by a preset reference time period, with the first moment in time being a moment at which the detected voltage and current values are acquired to control the power factor.

13. The power conversion method according to claim 12, wherein the reference time period is longer than a length of time required for calculating the variation amount of frequency of grid voltage and determining whether the power conversion device is in the islanding operation mode.

14. The power conversion method according to claim 12, further comprising storing, in time sequence, power factor value information indicating a power factor value calculated based on voltage value information indicating a detected voltage value and current value information indicating a detected current value at a same time period as each other.

15. The power conversion method according to claim 14, further comprising injecting inject reactive power to the grid power source side based on a power factor value indicated by the stored power factor value information.

16. The power conversion method according to claim 12, further comprising detecting the islanding operation mode when an absolute value of a maximum variation amount of frequency of the grid voltage during a preset determination time period is equal to or greater than a preset variation amount threshold value.

17. The power conversion method according to claim 16, further comprising avoiding the detecting of the islanding operation mode when the absolute value of the maximum variation amount of frequency of the grid voltage during the determination time period is less than the variation amount threshold value.

18. The power conversion method according to claim 15, further comprising:
storing command value information indicating the power factor command value; and
calculating an injection amount of reactive power to be injected to the grid power source side based on the power factor command value indicated by the stored command value information.

19. The power conversion method according to claim 18, further comprising increasing or decreasing the injection amount of the reactive power injected to the grid power source side based on a magnitude relationship between the stored power factor value and the power factor command value indicated by the command value information.

20. The power conversion method according to claim 19, further comprising:
increasing the injection amount of reactive power by a preset unit injection amount when the calculated power factor is less than the power factor command value; and
decreasing the injection amount of reactive power by a preset unit injection amount when the calculated power factor is equal to or greater than the power factor command value.

* * * * *